W. H. HAZLETT

May 17, 1932. UNDERREAMER Re. 18,473

Original Filed Oct. 23, 1924 2 Sheets-Sheet 1

W. H. HAZLETT

May 17, 1932. UNDERREAMER Re. 18,473

Original Filed Oct. 23, 1924 2 Sheets-Sheet 2

INVENTOR:
WALTER H. HAZLETT,
BY
Fred W. Ramin
ATTORNEY.

Reissued May 17, 1932

Re. 18,473

UNITED STATES PATENT OFFICE

WALTER H. HAZLETT, OF LOS ANGELES, CALIFORNIA, ASSIGNOR, BY DIRECT AND MESNE ASSIGNMENTS, TO JOHN GRANT, OF LOS ANGELES, CALIFORNIA

UNDERREAMER

Original No. 1,674,040, dated June 19, 1928, Serial No. 745,324, filed October 23, 1924. Application for reissue filed June 1, 1931. Serial No. 541,479.

My invention relates to the art of drilling oil wells, and is particularly applicable to the drilling of oil wells by what is known as the rotary system.

In this system a rotary bit or cutter is secured to the bottom of a string of drill pipe being rotated by a rotary table situated at the surface of the ground. Rotary mud is forced downwardly through the drill pipe and through openings in the bit to a point near the bottom of the hole, this mud being circulated by means of high pressure pumps situated on the derrick floor. The mud so circulated serves to carry upwardly with it the cuttings from the bit, and also serves to cement and mud-up the walls of the hole, so that they will stand without the necessity of casing, it being very common to drill holes in excess of 2000 feet deep by the rotary method without the use of any casing whatever, the rotary mud under pressure serving to hold up the walls of the well and make such drilling possible.

It is not the usual practice in drilling with the rotary method to carry pipe, that is to say, it is not the practice to suspend in the well a string of casing through which the drill pipe projects, this casing being used to hold up the wall of the well, as is the usual practice when drilling a well by the so-called standard or reciprocating system. In some cases, however, it is highly desirable to be able to carry casing, this casing being suspended in the well during the drilling operation and gradually lowered as the drilling progresses.

It is necessary to frequently withdraw the drill pipe for the purpose of replacing or sharpening the bits, and one of the principal values of carrying casing is to prevent the well from caving during the time the drill pipe and bit are being withdrawn. This necessitates the use of a bit which will pass readily through the casing and which will, therefore, drill a hole either smaller or of approximately the same diameter as the inside of the carried casing. Casing cannot pass through a hole of smaller diameter than its outside diameter, and the practice of carrying casing in rotary drilling has never been generally adopted.

It is an object of my invention, however, to provide an underreamer which may be collapsed in such a manner as to pass readily through the casing but which automatically expands as it leaves the casing so that it will drill a hole somewhat larger than the outside diameter of the casing.

It is a further object of my invention to provide such an underreamer which can be readily drawn upwardly into the casing for withdrawal from the well, said underreamer being collapsed for this purpose.

It is a further object of the invention to provide a novel form of oscillating cutting device which, while applicable to this particular field, may also be used on other types of bit or reamer.

It is a further object of the invention to provide a novel means for operating the cutting member of the device.

It is a still further object of the invention to provide a thrust receiving member.

Other objects and advantages of the invention will be made evident hereinafter.

Referring to the drawings which are for illustrative purposes only, and in which I show a preferred form of my invention.

Fig. 3 is a section taken as indicated by the line 3—3 of Fig. 1.

Fig. 4 is an enlarged fragmentary sectional view showing the novel locking means employed in this embodiment of my invention.

Fig. 8 is a section taken substantially as indicated by the line 8—8 of Fig. 1.

Figure 1:
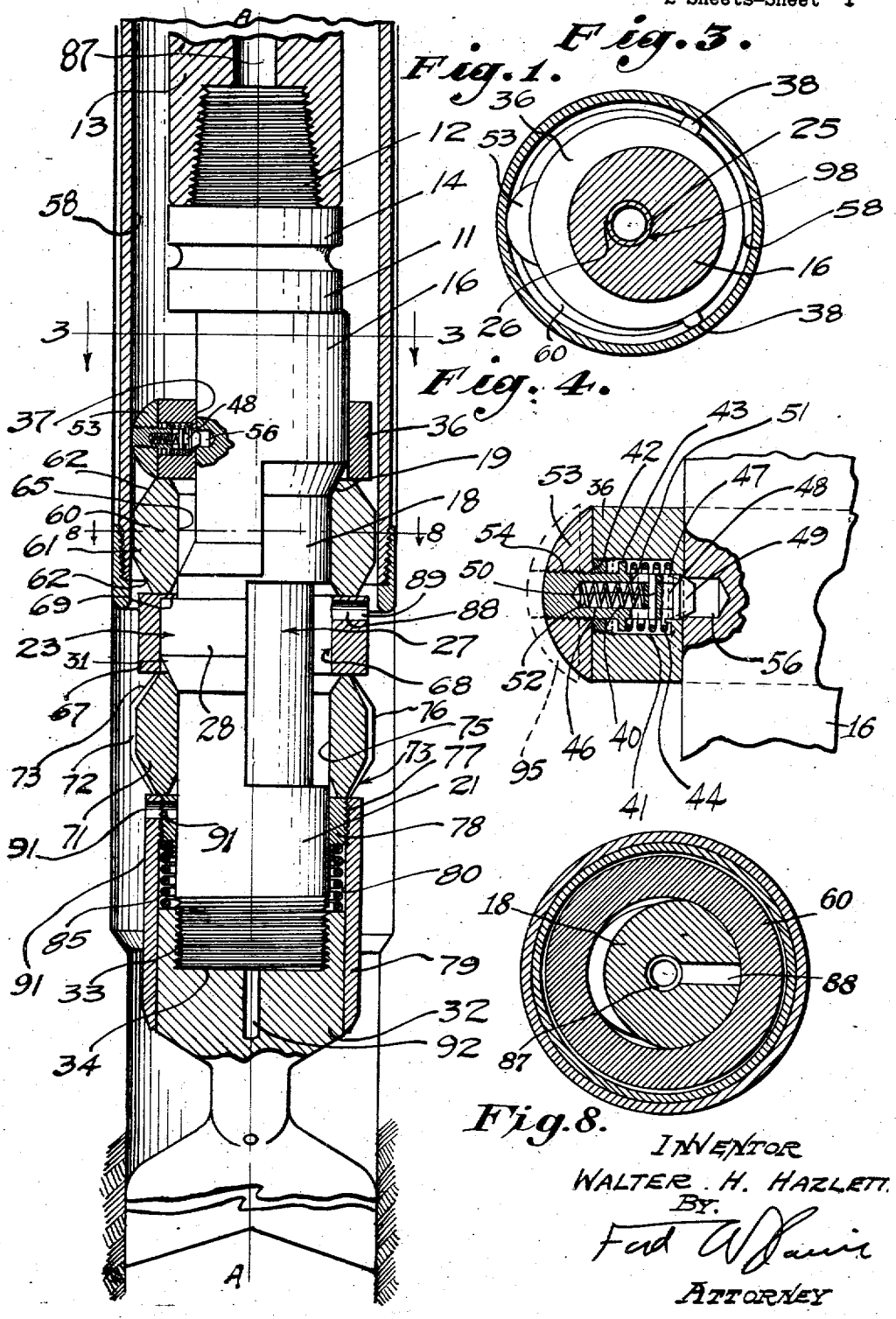
Fig. 1 is a vertical view of a device employing the features of my invention, this view being partially in section and showing the disposal of the parts when the device is in non-operating or retracted position.
Figure 2:
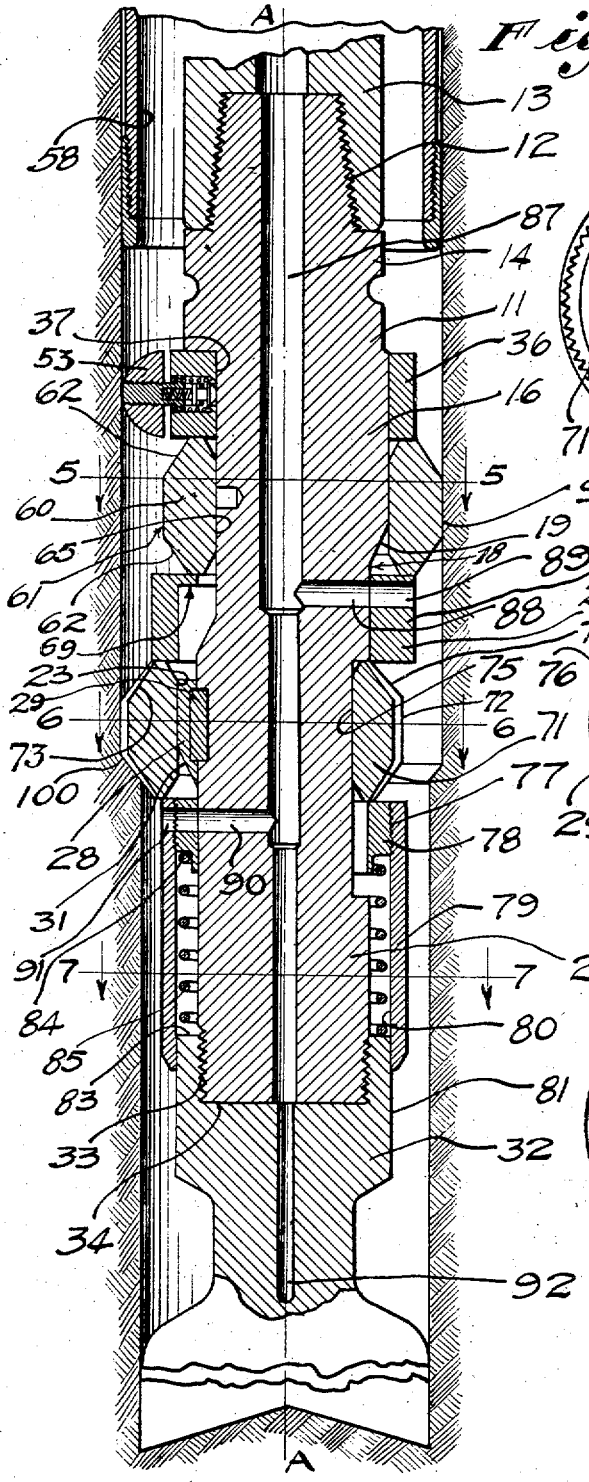
Fig. 2 is a sectional view similar to Fig. 1, this view showing the disposal of the parts of the device when the underreamer is in operating or reaming disposal.
Figure 5:
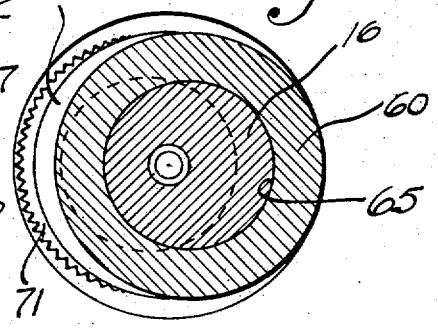
Fig. 5 is a section taken as indicated by the line 5—5 of Fig. 2.
Figure 6:
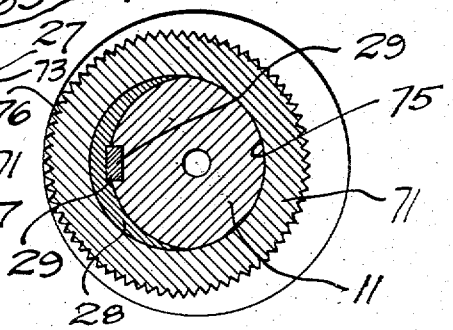
Fig. 6 is a sectional view taken as indicated by the line 6—6 of Fig. 2.
Figure 7:
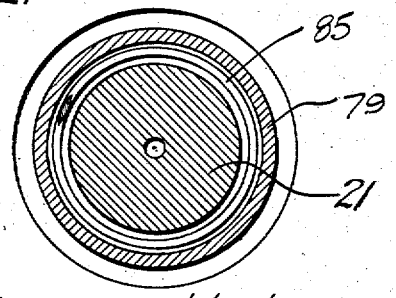
Fig. 7 is a sectional view taken as indicated by the line 7—7 of Fig. 2.

In the drawings I show my invention as comprising a body 11 having a threaded pin 12 formed at the upper end thereof. This pin 12 is arranged for attachment to a tool joint 13 which is in turn attached to the lower end of a string of drill pipe (not shown). An upper bearing or cam portion 16 is formed on the body 11, this cam portion 16 being cylindrical in shape, as shown, and being arranged eccentrically with respect to the central axis A—A of the body 11, and so located as to move in a circular path similar to that of a crank, when the body 11 is rotated. Below the upper cam 16 is formed an upper concentric bearing portion 18, this concentric portion 18 having an axis coinciding with the axis A—A of the body 11. A longitudinally angled guiding cam face 19 is provided, as clearly shown in Figs. 1 and 2, this guide 19 extending between the lower edge of the upper cam 16 and the upper edge of the upper concentric portion 18. At the lower end of the body 11 I provide a lower concentric bearing portion 21 which has an axis coinciding with the axis A—A of the body 11. Between the upper and lower concentric portions 18 and 21 I provide a lower bearing or cam 23, this cam 23 being cylindrical in shape and being disposed so that the center line thereof is eccentric with respect to the axis A—A of the body 11. The axis of the upper cam 16 is indicated at 25 in the drawings, and the axis of the lower cam 23 is indicated at 26. From the drawings it will be seen that the centers of the upper and lower cams are disposed on opposite sides of the axis A—A and at equal distances therefrom. The lower cam 23 is provided by forming an eccentric face 27 and by providing a filler piece 28, as shown in Figs. 2 and 6, this filler piece being secured in place by means of a key 29. The purpose of the filler piece 28 is to build up the lower cam 23 so that the outer face thereof will be cylindrical. The filler piece 28 provides a lower longitudinally angled guiding cam face 31 which extends as shown in Fig. 2.

A bit 32 may be secured to the lower end of the body 11, the lower threaded end 33 of the body 11 being threadedly secured in the socket 34 of the bit 32. If the reaming construction is to be employed in combination with a bit, this arrangement is employed. However, if it is intended for the underreaming construction to be employed as an underreamer only, a suitable guiding nose member may be substituted for the bit 32.

A retaining member 36 which comprises a cylindrical body having a cylindrical opening 37 is placed on the upper cam 16, this retaining member 36 having centralizing lugs 38, as shown in Fig. 3. When the device is in non-operating position, the retaining ring 36 is situated on the lower end of the cam 16; and when the device is in operating position, the retaining member 36 is situated at the upper end of the upper cam 16, as shown in Fig. 2. For locking the retaining member 36 in its lowermost or non-operating position, I provide a lock construction, as is clearly shown in Fig. 4. The lock comprises a plunger 40 which extends into an opening 41 in the ring 36, this plunger 40 being retained in the opening 41 by a nut 42 which is engaged by a flange 43 when the plunger assumes its outer position. For resiliently retaining the plunger 40 in its outermost position, a spring 44 is provided which is situated in the opening 41 and bears against the flange 43, as shown. The plunger 40 has a central opening 46, into which the cylindrical portion 47 of a locking pin 48, having a head 49, extends. The pin 48 is retained in the opening 46 by means of a bar 50 which extends into slots 51 of the plunger 40. A spring 52 is provided for resiliently retaining the locking pin 48 in locking position. A cap 53 is secured to the outer end of the plunger 40, as indicated by the threaded engagement 54 in Fig. 4. When the plunger is in locking position, the head 49 of the locking pin 48 is forced into a locking opening 56 formed in the upper cam 16. The head 49, as shown, is provided with a beveled edge so that a side pressure thereagainst will not prevent the removing of the pin from the opening 56 when the plunger is allowed to move outwardly into non-locking position, it being readily seen that engagement between the beveled face and the opening 56 tends to force the pin 48 outwardly. When the device is being lowered to the bottom of the well, the lugs 38 engage with the internal face of the well casing 58, and the cap 53 engages with the inner face of the casing 58, being retained in locking position or in such a position that the pin 48, if aligned with the opening 56, will extend thereinto and lock the retaining member 36 in retaining position, as shown in Fig. 1. By providing resilient securement between the locking pin 48 and the plunger 40, it is possible to depress the plunger 40 even though the pin 48 is not aligned with the opening 56. It will be seen that in this case a relative movement between the plunger and the pin will occur. This makes it possible for the plunger and cap 40 and 53, respectively to be depressed during the elevating of the underreamer.

I provide a thrust receiving member 60 which has a cylindrical outer face 61 which is beveled at 62, and which has a concentric central opening 65. When the device is in its collapsed or non-operating position, the thrust receiving member 60 is situated on the lower concentric portion 18 and is positioned so as to be concentric to the axis A—A of the body 11, as shown in Fig. 1. When the device is in operating position, the thrust receiving member 60 is disposed on the upper cam 16 in the position shown in Fig. 2. Below the thrust receiving member 60 I provide an intermediate spacing member 67, which has a bore 68 and an upper lip 69. When the device is in its collapsed position, this intermediate member 67 is positioned on the lower cam 23, as shown in Fig. 1; and when the device is in operating position, the intermediate member 67 moves upwardly and becomes journaled on the upper concentric portion 18, as shown in Fig. 2. The upper face of this intermediate member engages with the lower face of the thrust member 60.

A cutter member 71 comprises a cylindrical body having an outer cylindrical face 72 which is beveled at 73, as shown, and has a cylindrical concentric bore 75. The outer face 72 is serrated so as to provide cutting teeth 76, as shown in the drawings. The cutter 71 is positioned on the lower concentric portion 21 when the device is in its collapsed position, and it journals on the lower cam 23 when the device is in its expanded or reaming position. A driver 77 is provided in the form of a ring or collar 78 which slides on the lower concentric portion 21. Threadedly secured to the ring 78 and extending downwardly therefrom is a skirt 79, this skirt having an inner face 80 which engages with the cylindrical face 81 of the head of the bit 32. Compressed between the upper shoulder 83 of the bit 32 and the lower shoulder 84 of the collar 78 is a coil spring 85 which exerts an upward resilient pressure against the driver 77. The purpose of this driver member 77 is to translate the movable parts described, to their upper or operating positions and to yieldingly retain them in such positions.

Rotary mud is supplied to the underreamer through a central passage 87. Connected with the passage 87 is a passage 88, which communicates with an opening 89 in the intermediate member 67, this opening 89 coinciding with the passage 88 when the member 87 is in operating position. A branch 90 is provided which communicates with an opening 91 in the driver 77 when the driver is in the position shown in Fig. 2, this branch 90 serving to provide lubrication for the cutter member 71. The lower end of the passage 87 is arranged to supply lubricating fluid to the passage 92 of the drill 32, supplying lubrication for the cutting edge thereof.

The operation of the construction just described may be as follows:

When the underreaming bit is to be lowered into a well, through casing which is suspended therein, the retaining ring 36 is forced into retaining position, as shown in Fig. 1, this forcing the movable parts into their collapsed or non-operating position, as shown and previously described, against the action of the driver 77. The cap 53 is then forced inwardly from the position indicated by the dotted lines 95 in Fig. 4 into the full lines of this figure. This forces the head 49 of the locking pin 48 into the opening 56 and retains the retaining member 36 and the other movable parts of the underreamer in non-operating position. The underreamer is then inserted into the upper end of the well casing, the engagement between the cap 53 and the inner wall of the casing 58 serving to retain the locking arrangement in locking position, as previously described. The underreamer is then lowered through the casing, the parts being retained in non-operating or collapsed position until the cutting members are below the casing. When the bit leaves the lower end of the casing 58, the cap 53 moves outwardly into the position shown in Fig. 2. This removes the locking pin 48 from the opening 56 and allows the movable parts of the device to be moved upwardly into operating or expanded position by the action of the driver 77, the parts at this time assuming the position shown in Fig. 2 of the drawings. It will be seen that as the thrust receiving member 60 is moved upwardly, it contacts with the upper guiding face 19 and is moved radially in a manner to readily slide upon the upper cam 16. Likewise, the cutter member 71 contacts the lower guide face 31, and is moved radially opposite to the thrust ring so as to slide readily upon the lower cam 23. The body 11 is then rotated by a rotary table through the drill pipe, not shown. This causes the upper and lower cams to bodily move through a circular orbit, the axial centers of the cams 16 and 23 travelling through a cycle as indicated by the line 98 of Fig. 3. It will be seen that the upper cam 16, as it moves through a cycle indicated by the line 98, bodily moves the thrust receiving member 60 through a similar cycle. Throughout this cycle the thrust receiving member 61 is brought into engagement with the wall of the hole being reamed, as indicated at 99 in Fig. 2. The lower cam 23, as it moves through a cycle indicated by the line 98, will bodily move the cutter member 71 through a cycle similar to that of the thrust receiving member 60. This brings the cutting teeth 76 and the cutting member 71 into engagement with the wall of the hole being reamed throughout the cycle, as indicated at 100 in Fig. 2.

It will be seen that owing to the fact that the centers of the upper and lower cams 16 and 23 are diametrically opposed, the points of engagement of the thrust receiving member 60 and the cutter 71 will be diametrically opposite, and side motion is thereby obviated. As the body 11 rotates, the cutter 71 has a rolling engagement with the wall of the hole being reamed, and this engagement will cause a breaking away of the wall, most of this breaking away being accomplished by the teeth on the lower beveled face 73, whereas the teeth 76 on the cylindrical face 72 serve to smooth and true up the reamed portion of the hole. When the lower beveled face of the cutter 71 wears away, the cutter may be inverted and the upper beveled face 73 made to replace this lower and worn beveled face, thereby providing what is equal to a new cutter and making the life of this cutter 71 substantially twice as long.

When the device is to be elevated to the surface of the well, it is pulled up. As the retaining ring 36 enters the lower end of the casing 58, the cap 53 will be forced inwardly. This is possible, due to the resilient association between the pin 48 and the plunger 40, as previously described. The upper beveled face 62 of the thrust receiving ring 60 engages the lower end of the casing 58. This forces the ring downwardly onto the upper concentric portion 18, which moves this thrust receiving ring 60 radially so as to be concentric to the axis of the body, and also forces the movable parts of the device therebelow into nonoperating position as shown in Fig. 1. Owing to the fact that any engagement between the parts of the underreamer and the casing, as it is being moved upwardly therethrough, tends to move these parts into nonoperating position, the construction will not bind but will pass freely therethrough.

The term "underreamer" tends to convey the impression that my invention is solely for the purpose of underreaming for a well casing which is advanced downwardly into a well as the drilling progresses. I wish to impress, however, that my invention is equally useful as a reamer which operates continuously with a bit. As an example, in some wells a short surface casing which extends through the stovepipe casing, is employed for preventing a caving-in of the softer strata near the surface. In removing or inserting the bit and reamer, they must pass through this surface casing. My invention is very suitable for use under these conditions, owing to the novel means for locking the cutter elements in contracted position while the bit passes through the casing.

From the foregoing description, it will be seen that a very important feature of this invention is the provision of a cutter which is arranged to be bodily moved longitudinally and radially from a collapsed position to a position to ream a hole. By providing the thrust receiving ring 60, any radial or side motion in the underreamer is entirely counteracted due to the fact that the point of engagement of the thrust receiving ring is at all times diametrically opposite to the engagement of the cutter 71 to the wall of the hole, the novel cam arrangements making this possible.

The ends of the bores in the thrust member and in the cutter preferably have their walls longitudinally angled outwardly to provide a cam surface for cooperation with the guiding cam faces on the body so that these members may more easily slide axially onto the cam portions of the body.

I claim as my invention:

1. In a rotary underreamer, the combination of: a body having a substantially concentric bearing portion and an adjacent eccentric bearing portion; a rotary cutter normally positioned on said concentric portion of the body; and means operable to axially translate said cutter from said concentric bearing portion onto said eccentric bearing portion for rotation thereon when the body is rotated.

2. In a rotary underreamer, the combination of: a body having a substantially concentric bearing portion, an eccentric bearing portion and an intermediate longitudinally angled cam face; a rotary cutter normally positioned on said concentric portion of the body; and means operable to axially translate said cutter from said concentric bearing portion to slide over said angled cam face onto said eccentric bearing portion for rotation thereon when the body is rotated.

3. In a rotary underreamer, the combination of: a body having a substantially concentric bearing portion and an eccentric bearing portion longitudinally disposed; a rotary cutter normally positioned on said concentric portion of the body; and means operable to axially translate said cutter from said concentric bearing portion onto said eccentric bearing portion for rotation thereon when the body is rotated, one of the co-engaging edges of the cutter and the eccentric bearing portion of the body being longitudinally angled to facilitate the translation of the cutter.

4. In an underreamer, the combination of: a body having upper and lower cams and upper and lower concentric portions, said cams being diametrically opposed; a thrust receiving member carried by said body; a cutter carried by said body; a retaining member for retaining said thrust receiving member on said upper concentric portion and said cutter on said lower concentric portion; and means for moving said thrust receiving member onto said upper cam and said cutter onto said lower cam, said thrust receiving member and said cutter being moved in radial oscillations by said cams when said body is rotated.

5. In an underreamer, the combination of: a body having upper and lower cams and upper and lower concentric portions, said cams being diametrically opposed; a thrust receiving member carried by said body; a cutter carried by said body; a retaining member for retaining said thrust receiving member on said upper concentric portion and said cutter on said lower concentric portion; a lock for releasably locking said retaining member in retaining position; and means for moving said thrust receiving member onto said upper cam and said cutter onto said lower cam when said lock is released, said thrust receiving member and said cutter being moved in radial oscillations by said cams when said body is rotated.

6. In an underreamer, the combination of: a body having upper and lower cams and upper and lower concentric portions, said cams being diametrically opposed; a thrust-receiving member carried by said body; a cutter carried by said body; a retaining member for retaining said thrust receiving member on said upper concentric portion and said cutter on said lower concentric portion; a lock for releasably locking said retaining member in retaining position, said lock comprising a plunger carried by said retaining member, said plunger being arranged for extension into an opening in said body to lock said retaining member in retaining position, a cap attached to the outer end of said plunger, and a spring for removing said plunger from said opening when a pressure on said cap is removed; and means for moving said thrust receiving member onto said upper cam and said cutter onto said lower cam when said lock is released, said thrust receiving member and said cutter being moved in radial oscillations by said cams when said body is rotated.

7. An underreamer as defined in claim 6 in which said plunger is retained in locking position due to engagement between said cap and the casing of a well, said cap being disengaged when said cap moves out of the casing.

8. In an underreamer, the combination of: a body having upper and lower cams and upper and lower concentric portions, said cams being diametrically opposed; a thrust receiving member carried by said body; a cutter carried by said body; a retaining member for retaining said thrust receiving member on said upper concentric portion and said cutter on said lower concentric portion; a driver disposed on said lower concentric portion and engaging said cutter; and means whereby said driver is caused to move said thrust receiving member and said cutter on said upper and lower cams respectively, when said lock is released.

9. An underreamer as defined in claim 4 in combination with guiding faces for guiding said thrust receiving member and said cutter onto their respective cams.

10. In an underreamer, the combination of: a body having upper and lower cams and upper and lower concentric portions, said cams being diametrically opposed; a thrust receiving member carried by said body; a cutter carried by said body; a retaining member for retaining said thrust receiving member on said upper concentric portion and said cutter on said lower concentric portion; an intermediate member disposed between said thrust receiving member and said cutter; and means for moving said thrust receiving member onto said upper cam and said cutter onto said lower cam, said thrust receiving member and said cutters being moved in radial oscillations by said cams when said body is rotated.

11. A rotary underreamer body having: a substantially concentric bearing portion and an adjacent offset eccentric bearing portion longitudinally disposed, the concentric portion forming a bearing for a rotary cutter in collapsed position and the eccentric portion forming a bearing for said cutter in expanded position.

12. An underreamer body having: a substantially concentric bearing portion, an adjacent offset eccentric bearing portion and an intermediate longitudinally angled cam face.

13. An underreamer body having: a substantially concentric bearing portion and an adjacent offset eccentric bearing portion, said concentric portion having a retaining orifice formed therein.

14. An underreamer body having: two relatively spaced substantially concentric bearing portions, an offset eccentric bearing portion between said concentric bearing portions, an offset eccentric bearing portion adjacent and above the upper concentric bearing portion, and an abutment shoulder above the upper eccentric bearing portion, the bearing portions being longitudinally disposed and the eccentric portions being oppositely offset transversely.

15. An underreamer body having: two oppositely offset relatively spaced eccentric bearing portions, a substantially concentric bearing portion between said eccentric bearing portions, and a substantially concentric bearing portion below the lower eccentric portion, the several bearing portions being longitudinally disposed.

16. An underreamer body having: two oppositely offset relatively spaced eccentric bearing portions, a substantially concentric bearing portion between said eccentric bearing portions, a substantially concentric bearing portion below the lower eccentric portion, and longitudinally angled cam faces connecting each concentric bearing portion with the upper adjacent eccentric bearing portion, the several bearing portions being longitudinally disposed.

17. In a rotary underreamer, an arbor having an eccentric portion, a roller cutter on said arbor, said cutter being lengthwise of the arbor shiftable to and from a position bearing on said eccentric bearing.

18. In a rotary underreamer, a mandrel, a roller cutter embracing said mandrel, said cutter being shiftable laterally on and with relation to said mandrel so as to position it either in projected or retracted position.

19. In a rotary underreamer, a mandrel, a roller cutter journalled thereon about the axis of said mandrel, said mandrel having a laterally offset journal portion, said cutter being longitudinally movable on said mandrel to position it either off or upon said offset portion whereby to dispose it in retracted or projected position.

20. In a rotary underreamer, a mandrel, a roller cutter journalled thereon about the axis of said mandrel, said mandrel having a laterally offset journal portion, said cutter being longitudinally movable on said mandrel to position it either off or upon said offset portion whereby to dispose it in retracted or projected positions, and means urging said cutter upon said offset portion.

21. In an underreamer, a mandrel having thereon an offset cutter bearing of limited longitudinal extent, and an annular cutter element surrounding and movable longitudinally on the mandrel and adapted to fit around the offset bearing.

22. In an underreamer, a mandrel having thereon an offset cutter bearing of limited longitudinal extent and having a reduced portion longitudinally adjacent the offset bearing, and an annular cutter element surrounding and movable longitudinally on the mandrel, adapted to fit closely around the offset bearing and to fit loosely around the reduced portion.

23. In a device of the character described, a mandrel having thereon a relatively enlarged eccentric cylindric bearing of limited longitudinal extent, and an annular roller surrounding and movable longitudinally on the mandrel and having a cylindric bore adapted to fit around the bearing for rotation of the roller thereon.

24. In an underreamer, a mandrel having longitudinally spaced cylindric parts of relatively larger and smaller diameters, and a rotatable cutter element surrounding the mandrel and having an internal cylindric bearing adapted to fit upon the larger mandrel part when the cutter element is in one longitudinal position and to loosely surround the smaller mandrel part when the cutter element is in another longitudinal position.

25. In an underreamer, a mandrel having thereon an offset cutter bearing of limited longitudinal extent and having a reduced portion longitudinally adjacent the offset bearing, a diagonal cutter guiding surface between the reduced portion and the cutter bearing, and an annular cutter element surrounding and movable longitudinally on the mandrel, adapted to fit closely around the offset bearing and to fit loosely around the reduced portion.

26. In a device of the character described, a mandrel having thereon a relatively enlarged eccentric cylindric bearing of limited longitudinal extent and having a relatively reduced portion longitudinally adjacent the bearing, a conical cutter guiding part between the cylindric bearing and the reduced portion, and an annular roller surrounding and movable longitudinally on the mandrel and having a cylindric bore adapted to fit around the bearing for rotation of the roller thereon and adapted to fit loosely around the relatively reduced portion, and the cutter having at the end of its cylindric bore a conical bore part complementary to the conical guiding part on the mandrel.

27. In an underreamer, a mandrel having thereon a plurality of spaced offset bearings of limited longitudinal extent and having a corresponding number of reduced portions each longitudinally adjacent an offset bearing, a plurality of annular elements surrounding and movable longitudinally on the mandrel, each adapted to fit around one of the offset bearings and to move longitudinally between a position on such bearing and a position surrounding the adjacent reduced part, and means pressing longitudinally against one of the annular elements to move all said elements longitudinally on the mandrel.

28. In an underreamer, a mandrel having thereon a plurality of spaced offset bearings of limited longitudinal extent and having a corresponding number of reduced portions each longitudinally adjacent an offset bearing, one of said reduced portions being located between two of said offset bearings, a plurality of annular elements surrounding and movable longitudinally on the mandrel and each adapted in one position to fit around one of the offset bearings and to move longitudinally between a position on such bearing and a position surrounding the adjacent reduced part, and an annular spacer surrounding the mandrel and positioned between two elements, said spacer having a bore large enough to fit over a bearing.

29. In a device of the character described, a mandrel, an annular roller element surrounding the mandrel and movable longitudinally thereon, and means to cause lateral shifting of the roller element on and with relation to the mandrel by virtue of its longitudinal movement thereon.

30. In a rotary underreamer, a mandrel, a cutter element embracing said mandrel and shiftable laterally on and with relation to said mandrel so as to position it either in projected or retracted position.

31. In a rotary underreamer, a mandrel, a cutter element embracing said mandrel and shiftable rectilinearly laterally on and with relation to said mandrel so as to position it either in projected or retracted position.

32. In an underreamer, a mandrel having thereon an offset cutter bearing of limited longitudinal extent and a reduced portion longitudinally adjacent the offset portion, a cutter element surrounding and movable longitudinally on the mandrel and adapted in one position to fit around the offset bearing and in another position to surround the adjacent reduced part, and an annular member surrounding the mandrel adjacent the cutter element and movable longitudinally therewith, said member adapted in one part of its length to fit over the offset bearing and in another part of its length to fit over the reduced part.

WALTER H. HAZLETT.